US010816336B2

(12) United States Patent
Cowan et al.

(10) Patent No.: US 10,816,336 B2
(45) Date of Patent: Oct. 27, 2020

(54) MEASUREMENT OF WORM GEARS

(71) Applicant: GLEASON METROLOGY SYSTEMS CORPORATION, Dayton, OH (US)

(72) Inventors: Mark E. Cowan, Dayton, OH (US); Parag P. Wagaj, Springboro, OH (US)

(73) Assignee: GLEASON METROLOGY SYSTEMS CORPORATION, Dayton, OH (US)

( * ) Notice: Subject to any disclaimer, the term of this patent is extended or adjusted under 35 U.S.C. 154(b) by 288 days.

(21) Appl. No.: 16/073,903

(22) PCT Filed: Feb. 28, 2017

(86) PCT No.: PCT/US2017/019822
§ 371 (c)(1),
(2) Date: Jul. 30, 2018

(87) PCT Pub. No.: WO2017/151542
PCT Pub. Date: Sep. 8, 2017

(65) Prior Publication Data
US 2019/0041203 A1 Feb. 7, 2019

Related U.S. Application Data

(60) Provisional application No. 62/301,772, filed on Mar. 1, 2016.

(51) Int. Cl.
| | |
|---|---|
| *G01B 21/20* | (2006.01) |
| *F16H 1/16* | (2006.01) |
| *G01B 11/24* | (2006.01) |
| *G01B 5/20* | (2006.01) |
| *G01M 13/021* | (2019.01) |

(Continued)

(52) U.S. Cl.
CPC ............... *G01B 21/20* (2013.01); *F16H 1/16* (2013.01); *F16H 55/22* (2013.01); *G01B 5/202* (2013.01); *G01B 7/283* (2013.01); *G01B 11/2416* (2013.01); *G01M 13/021* (2013.01)

(58) Field of Classification Search
CPC .... G01B 11/2416; G01B 5/202; G01B 21/20; G01B 5/008; G01B 7/283
USPC ...................................................... 33/501.14
See application file for complete search history.

(56) References Cited

U.S. PATENT DOCUMENTS

| | | | | |
|---|---|---|---|---|
| 2,542,546 | A | * | 2/1951 | Mackmann ............. B23F 11/00 407/23 |
| 3,710,640 | A | * | 1/1973 | Stanger .................. F16H 55/22 74/425 |
| 5,836,076 | A | | 11/1998 | Duta et al. |

(Continued)

OTHER PUBLICATIONS

Houser et al., "Definition and Inspection of Profile and Lead of a Worm Wheel", Gear Technology, vol. 16, No. 6, Nov.-Dec. 1999, pp. 17-23.

(Continued)

*Primary Examiner* — Yaritza Guadalupe-McCall
(74) *Attorney, Agent, or Firm* — Robert L. McDowell

(57) ABSTRACT

A method of determining the minimum radius and the mounting distance of a worm gear member (6) of a worm drive (2). The root portion (26) of a tooth slot (24) is probed at a plurality of points along the length of the root and the locations of the points are utilized as the basis for determining the minimum radius and the mounting distance.

15 Claims, 4 Drawing Sheets

(51) Int. Cl.
*G01B 7/28* (2006.01)
*F16H 55/22* (2006.01)

(56) References Cited

U.S. PATENT DOCUMENTS

| | | | |
|---|---|---|---|
| 2010/0132496 A1* | 6/2010 | Okamoto | F16H 55/0806 74/457 |
| 2012/0213602 A1* | 8/2012 | Winkel | G01M 13/021 409/61 |
| 2014/0090503 A1* | 4/2014 | Ohmi | F16H 55/0806 74/434 |
| 2018/0161896 A1* | 6/2018 | Wuerfel | B23F 23/006 |
| 2019/0041203 A1* | 2/2019 | Cowan | G01B 11/2416 |

OTHER PUBLICATIONS

Mohan, L.V. et al., "Geometrical Aspects of Double Enveloping Worm Gear Drive", Mechanism and Machine Theory, vol. 44, No. 11, Nov. 2009, pp. 2053-2065.

International Search Report and Written Opinion for PCT/US2017/019822, ISA/EPO, dated May 11, 2017, 11 pages.

\* cited by examiner

MEASUREMENT OF WORM GEARS

FIELD OF THE INVENTION

The invention relates to worm gears and in particular to a method of accurately determining the minimum radius and mounting distance of a worm gear.

BACKGROUND OF THE INVENTION

A worm drive is a gear arrangement in which a worm (i.e. a shaft with a spiral thread resembling a screw) meshes with and drives a worm gear (which is similar in appearance to a cylindrical gear). The two elements are also called the worm screw and worm wheel or, simply, the worm and wheel. The worm engages the wheel in a non-intersecting and perpendicular axes configuration. In worm drives, the helix angle of the wheel matches the lead angle of the worm. It is common for a worm to be made from steel and a wheel to be made from brass.

Worm drives provide high reduction ratios and torque multiplication with a small footprint compared to standard gear sets. Additionally, worm drives exhibit the inability to reverse the direction of power. Due to the friction between the worm and wheel, it is nearly impossible for a wheel (with rotational force applied) to transfer motion to the worm so as to rotate the worm.

Generally speaking, there are three types of worm drives:
1. Non-enveloping worm drives—the axial (lengthwise) profile of the worm and the longitudinal (width) profile of the teeth of the wheel are both straight. Neither the worm nor wheel has concave features.
2. Single-enveloping worm drives—the wheel has a concave tooth width thereby enabling the worm to nestle into the wheel which increases efficiency.
3. Double-enveloping worm drives—the wheel has a concave tooth width and the worm has a concave axial profile which further increases efficiency.

In cutting a worm wheel having teeth with a concave tooth width, control of the centerline of a tool (i.e. hob) in the axial direction of the worm wheel is most important as this effects the performance of the worm drive. In order to control the location of the centerline of the hob in the axial direction of the worm wheel, a dimension is specified called the "mounting distance". The mounting distance is the distance from a specified axial surface, (i.e. "mounting datum") to an axial location on the worm wheel known as the "throat", where the center of the mating worm shaft will be located in the worm drive assembly.

Traditional methods to determine actual mounting distance include:
1. On a hobbing machine—during manufacturing of a worm wheel, a small radial movement is performed in order to form a small cut on the worm wheel blank. The center of this cut is measured with rules/caliper by a trained operator so as to compute the mounting distance and adjust the hob location to achieve a desired distance. Accuracy of such measurement is operator dependent and it can be off by more than 0.5 mm
2. On an inspection machine—a part is programmed as a cylindrical gear and a short lead test is performed at various heights along both faces of the worm wheel. Heights are changed till the slope of the lead is same for both left and right flank of a tooth space. This takes many attempts and hence, it is time consuming. Also a large change in lead at the start of the lead test causes very small changes in the slope of the lead so accuracy of such measurement is part specific and operator specific and results can be off by more than 100 microns.

If the actual hob cutter location in the axial direction differs from the specified mounting distance by an amount greater than a mounting distance tolerance, the worm wheel will not perform as intended.

SUMMARY OF THE INVENTION

The invention is directed to a method of determining the minimum radius and the mounting distance of a worm gear member of a worm drive. The root portion of a tooth slot is probed at a plurality of points along the length of the root and the locations of the points are utilized as the basis for determining the minimum radius and the mounting distance.

DETAILED DESCRIPTION OF THE PREFERRED EMBODIMENT

Figure 1:
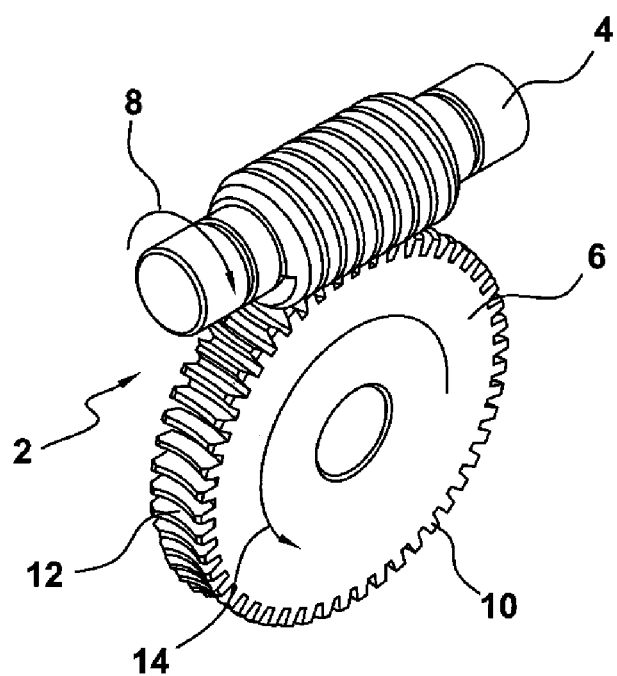
FIGS. 1 and 2 illustrate a single enveloping worm drive comprising a worm screw and a worm wheel.

The terms "invention," "the invention," and "the present invention" used in this specification are intended to refer broadly to all of the subject matter of this specification and any patent claims below. Statements containing these terms should not be understood to limit the subject matter described herein or to limit the meaning or scope of any patent claims below. Furthermore, this specification does not seek to describe or limit the subject matter covered by any claims in any particular part, paragraph, statement or drawing of the application. The subject matter should be understood by reference to the entire specification, all drawings and any claim below. The invention is capable of other constructions and of being practiced or being carried out in various ways. Also, it is understood that the phraseology and terminology used herein is for the purposes of description and should not be regarded as limiting.

The details of the invention will now be discussed with reference to the accompanying drawings which illustrate the invention by way of example only. In the drawings, similar features or components will be referred to by like reference numbers.

The use of "including", "having" and "comprising" and variations thereof herein is meant to encompass the items listed thereafter and equivalents thereof as well as additional items.

Although references may be made below to directions such as upper, lower, upward, downward, rearward, bottom, top, front, rear, etc., in describing the drawings, these references are made relative to the drawings (as normally viewed) for convenience. These directions are not intended to be taken literally or limit the present invention in any form. In addition, terms such as "first", "second", "third", etc., are used to herein for purposes of description and are not intended to indicate or imply importance or significance.

Figure 2:
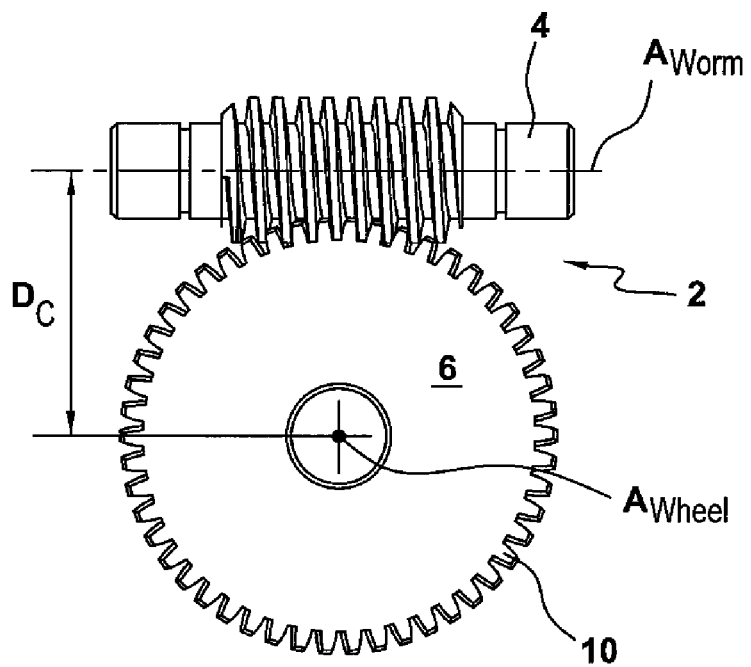

FIGS. 1 and 2 illustrate a single enveloping worm drive 2 comprising a worm screw 4 (i.e. worm) and a worm wheel 6 (i.e. wheel). Worm 2 is a single-start worm that rotates in direction 8 about an axis of rotation $A_{Worm}$. Wheel 6 comprises teeth 10 having a concave shape 12 in the width direction. Wheel 6 is rotatable in direction 14 about an axis of rotation $A_{Wheel}$. The distance between axes $A_{Worm}$ and $A_{Wheel}$ is referred to as the center distance $D_C$.

Figure 3:
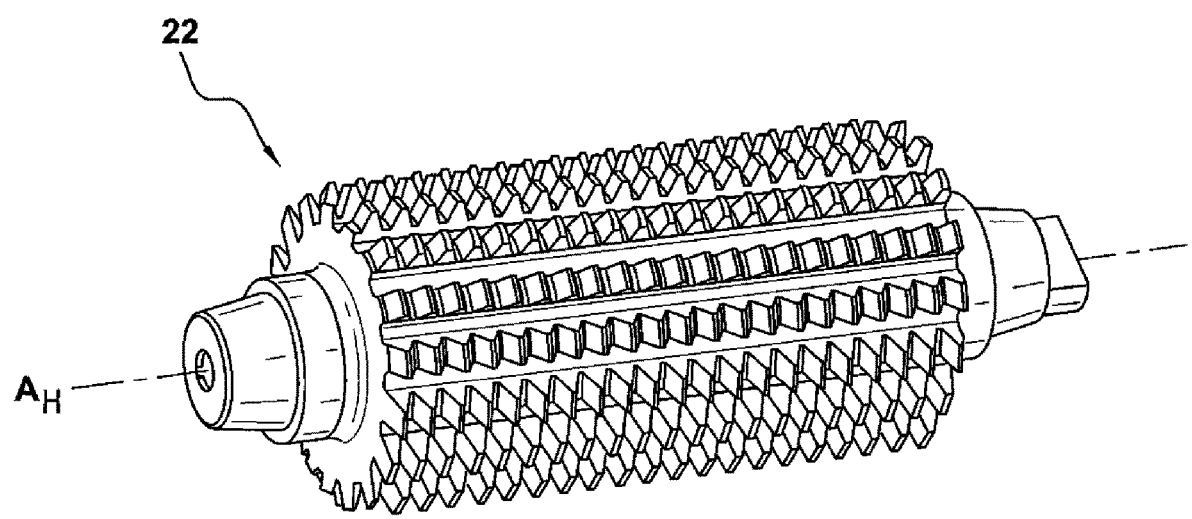
FIG. 3 shows an example of a hobbing tool for producing gears including worm wheels.
Figure 4:
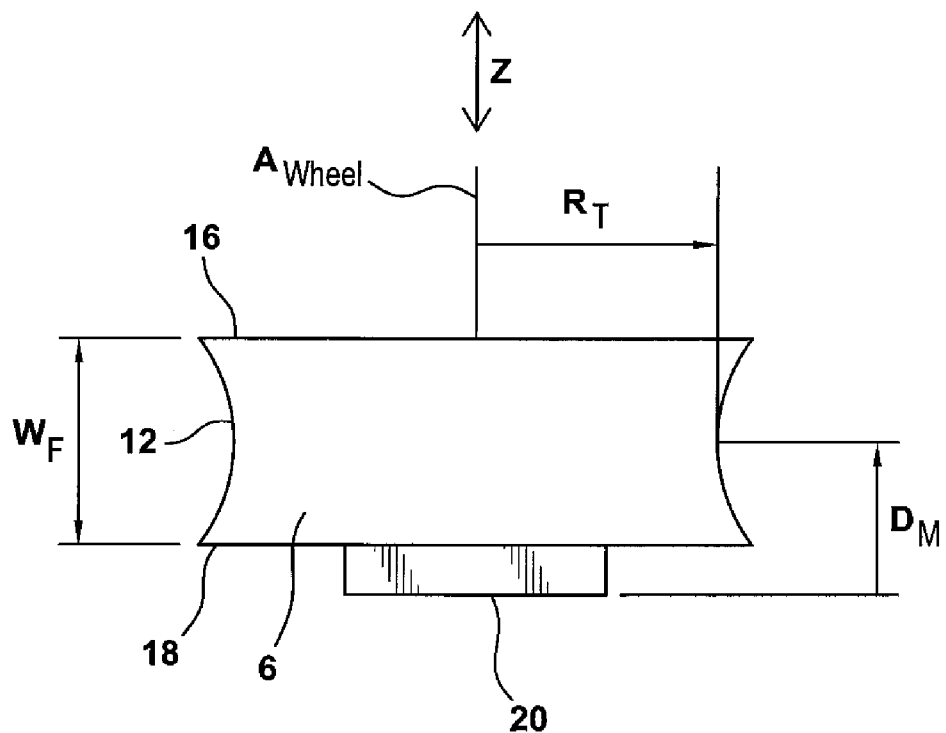
FIG. 4 is a schematic face-width view of an enveloping worm wheel.

For a typical cylindrical gear having involute tooth geometry that is cut by a hobbing process, the hobbing tool, such as hob 22 in FIG. 3 for example, is fed axially as it cuts the gear teeth thereby creating a consistent outside diameter along the face width of the gear. However, when cutting a worm wheel such as worm wheel 6 in FIG. 4, a hobbing tool, such as hob 22 for example, is fed radially into the worm wheel 6 being cut with no axial feed (no movement along the direction of the worm wheel face width, $W_F$). This cutting motion creates concave-shaped geometry 12 on the teeth 10 of the worm wheel such that its outside diameter (i.e. the periphery of the worm wheel) is circular arc in shape (i.e. concave) with the minimum radius, $R_T$, intended to be located in the center between the upper face 16 and lower face 18 of the worm wheel 6.

It is important that the location of the centerline, $A_H$, of hob 22 relative to the worm wheel 6 be controlled. As mentioned above, in order to control the location of the centerline of the hob, $A_H$, in the axial ($A_{Wheel}$) direction (Z-direction) of the worm wheel, a dimension is specified called the worm wheel "mounting distance" shown in FIG. 4 as $D_M$. The mounting distance is the distance from a specified axial surface 20, hereby called "mounting datum" or "reference face", to an axial location on the worm wheel 6 known as the "throat", where the center of the mating worm shaft is preferably located in the worm drive assembly. The location of the "throat" is at the minimum radius, $R_T$.

An actual hob cutter location (in the axial direction of a worm wheel) that is different from a specified mounting distance by an amount greater than a mounting distance tolerance amount will result in a worm wheel that will not perform as intended. Therefore, it can be appreciated that measuring a worm wheel to determine the actual mounting distance is important.

While utilizing a theoretical mounting distance $D_M$ will likely result in a reasonably good approximation of the minimum radius $R_T$ (i.e. the throat), this is not preferred since many parameters of a worm wheel (e.g. flank form, tooth index and tooth size (thickness) measurements) are determined based upon the location of the throat. Therefore, it can be seen that an error in the location of the throat will lead to subsequent errors in other worm wheel specifications based on the location of the throat.

The inventive method determines the actual location of the throat of a worm wheel, measured in the axial direction. The invention is based on measuring the root portion of a worm wheel and applying a best fit circle wherein the lowest point of best fit is utilized to determine the mounting distance.

The method can be carried out on any analytical gear inspection machine such as, for example, the model 300GMS Gear Inspection Machine commercially available from Gleason Metrology Systems Corporation of Dayton, Ohio.

The mounting datum 20 is probed (contact or non-contact type of probe) to establish its location. Using the design or theoretical mounting distance $D_M$, the probe 30 is moved to the theoretical height in the Z-direction (FIG. 4) where the root radius is, theoretically, at a minimum (throat). A reference tooth is probed on each side thereof to establish its rotational location at a reference diameter.

Figure 5:
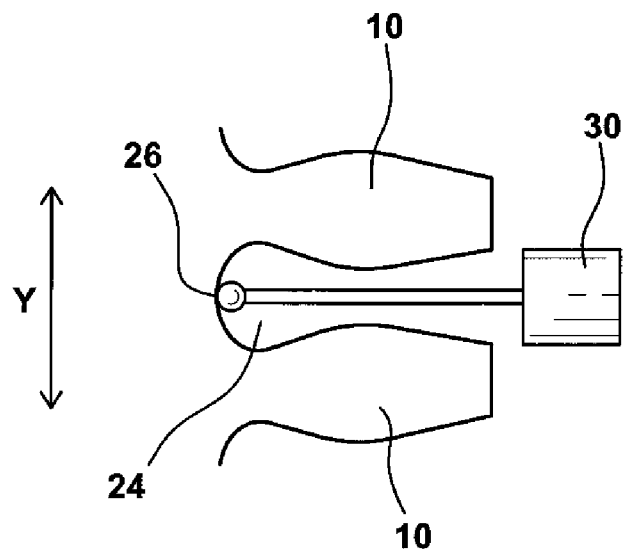
FIG. 5 illustrates placement of a measuring probe between gear teeth for probing the root portion of a tooth slot.
Figure 6:
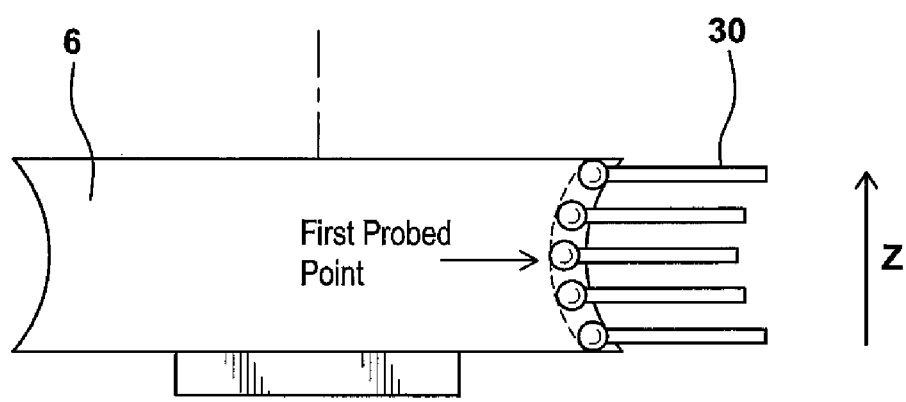
FIG. 6 shows an example of probing along the root portion to obtain points for determining the minimum radius and mounting distance.

Probe 30 is centered in a tooth space or slot 24 (Y center) between consecutive teeth 10 and moved into contact with the root 26 of the tooth space as shown in FIG. 5. As shown in FIG. 6, probe 30 is then moved along the root of the worm gear down (in Z direction) preferably 40% of face width from center (first probed point) and then up (in Z direction) preferably 40% of face width from center (first probed point). Although 40% of face width is preferred, the invention is not limited thereto.

A plurality of points along the root line are probed which preferably represent 80% of the face width in the root. For each point, the radius and height (Z) positions are recorded. Preferably at least five points are probed and more preferably seven points are probed. However, the invention is not limited to any particular number of points.

A best fitted curve is determined for the measured points (e.g. seven). Curve fitting is a process of constructing a curve or a mathematical function that has the best fit to series of data points. Best fitted curve computation, per se, is known and can use various mathematical techniques such as regression analysis, interpolation or smoothing for this step and the curve for above points may be, for example, second order polynomial curve or cubical spline or higher degree mathematical curve.

A second order best fitted polynomial curve is preferred:

$$Y = ax^2 + bx + c \qquad (1)$$

Where a, b and c are coefficients of best fitted polynomial curve. Best fitted curve is used for accuracy as well as improved reproducibility purposes.

Using coefficients of best fitted curves from Equation (1), the location along Z (height) where radius is at a minimum is determined by any of various approaches such as iterative process, which is preferred, or solving equation for slope of tangent.

The actual mounting distance is determined which is the distance of the throat (height where root of worm wheel is at its minimum radius, found above) from reference face 20 in the Z direction. The theoretical mounting distance may be replaced with the actual mounting distance for performing measurements.

The actual mounting distance may also be used in the final assembly of worm shaft and worm wheel for better contact of gears and may also be provided as feedback to the hobbing machine in order to adjust the position of the hob and/or workpiece so as to modify the mounting distance for subsequent workpieces.

While the invention has been described with reference to preferred embodiments it is to be understood that the invention is not limited to the particulars thereof. The present invention is intended to include modifications which would be apparent to those skilled in the art to which the subject matter pertains without deviating from the spirit and scope of the appended claims.

What is claimed is:

1. A method of determining a minimum root radius of a worm gear member of a worm drive, said worm gear member having an axis of rotation extending in a direction Z, a periphery comprising a plurality of teeth, and a face width with said plurality of teeth being located along said face width and extending between an upper face and a lower face of said worm gear member with a tooth space having a root located between adjacent teeth, a root radius being defined between said axis and said root, said method comprising:

probing a root of a tooth space between adjacent teeth, said probing comprising establishing a center location in said tooth space between said adjacent teeth and probing along said root at a plurality of points, each of said points being defined by a root radius position and a Z-direction position, said plurality of points forming a shape, best fitting a defined curve to the shape formed by said plurality of points, and determining a minimum root radius and a corresponding location in said Z-direction from said defined curve.

2. The method of claim 1 further comprising:
establishing an actual mounting distance defined by said determined minimum root radius and said corresponding location in said Z-direction.

3. The method of claim 1 wherein said probing is carried out by a contacting probe.

4. The method of claim 1 wherein said probing is carried out by a non-contacting probe.

5. The method of claim 2 further comprising communicating said actual mounting distance to a gear manufacturing machine and adjusting gear manufacturing process parameters on said machine in accordance with said actual mounting distance.

6. The method of claim 5 wherein said gear manufacturing machine comprises a hobbing machine.

7. The method of claim 6 wherein the adjusted process parameters comprise an adjustment to the position of a hob and a workpiece relative to one another so as to modify the mounting distance for subsequent gears produced on said hobbing machine.

8. The method of claim 1 wherein said probing along said root commences at a center point along the length of said root.

9. The method of claim 8 wherein said probing occurs in a first direction along the root with respect to said center point and in a second and opposite direction along the root with respect to said center point.

10. The method of claim 9 wherein each of said first direction and said second and opposite comprises 40 percent of the face width of said worm gear member.

11. The method of claim 1 wherein said plurality of points comprises at least five points.

12. The method of claim 11 wherein said plurality of points comprises seven points.

13. The method of claim 1 wherein the best fitted defined curve comprises a second order polynomial curve, a cubical spline or higher degree mathematical curve.

14. The method of claim 1 further comprising identifying a theoretical minimum root radius with respect to said axis, said theoretical minimum root radius being axially located at a theoretical mounting distance measured in said Z-direction.

15. The method of claim 14 wherein the theoretical mounting distance and the actual mounting distance are established in the Z-direction with respect to a reference surface located on said upper face or said lower face of said worm gear member.

* * * * *